(12) United States Patent
Falkenberg et al.

(10) Patent No.: US 10,031,932 B2
(45) Date of Patent: Jul. 24, 2018

(54) EXTENDING TAGS FOR INFORMATION RESOURCES

(71) Applicant: International Business Machines Corporation, Armonk, NY (US)

(72) Inventors: Matthias Falkenberg, Boeblingen (DE); Michael Junginger, Boeblingen (DE); Andreas Nauerz, Boeblingen (DE); Thomas Steinheber, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 13/683,250

(22) Filed: Nov. 21, 2012

(65) Prior Publication Data

US 2013/0138647 A1 May 30, 2013

(30) Foreign Application Priority Data

Nov. 25, 2011 (EP) .................................... 11190719

(51) Int. Cl.
*G06F 17/30* (2006.01)

(52) U.S. Cl.
CPC .. *G06F 17/30312* (2013.01); *G06F 17/30038* (2013.01); *G06F 17/30398* (2013.01); *G06F 17/30864* (2013.01)

(58) Field of Classification Search
CPC ......... G06F 17/30392; G06F 17/30398; G06F 17/30312; G06F 17/30038; G06F 17/30864
USPC .................................. 707/779, 759, 765–769
See application file for complete search history.

(56) References Cited

U.S. PATENT DOCUMENTS

| 8,713,053 B2 * | 4/2014 | Jennings ............. G06F 17/3087 707/769 |
| 2004/0073539 A1 * | 4/2004 | Dettinger et al. ................. 707/3 |
| 2004/0158455 A1 * | 8/2004 | Spivack ............ G06F 17/30731 704/9 |
| 2005/0289123 A1 * | 12/2005 | Dettinger et al. ................. 707/3 |

(Continued)

FOREIGN PATENT DOCUMENTS

| WO | WO 2009070659 A1 * | 6/2009 | ........... G06F 9/5077 |
| WO | 2010102515 A1 | 9/2010 | |

OTHER PUBLICATIONS

Limpens et al., "Helping Online Communities to Semantically Enrich Folksonomies," Seb Science Conf. 2010, Apr. 26-27, 2010, pp. 1 8.

*Primary Examiner* — James E Richardson
(74) *Attorney, Agent, or Firm* — Brian J. Colandreo, Esq.; Jeffrey T. Placker, Esq.; Holland & Knight LLP

(57) ABSTRACT

A method for extending a tag of an information resource in an information network may be provided. The method may include providing a group of tags, stored in a database, in a user interface, and selecting at least one tag out of the group of tags and linking the tag to an information resource using the user interface. Furthermore, the method may include extending the tag, such that the resulting extended tag may be a semantically structured string of characters building a first expression including a first operand, a first operator and a first value, wherein the tag may be the operand, such that the extended tag is machine-interpretable by a parser, such that the information resource may be tagged with the machine-interpretable, extended tag.

9 Claims, 5 Drawing Sheets

(56) References Cited

U.S. PATENT DOCUMENTS

| | | | |
|---|---|---|---|
| 2006/0085436 A1* | 4/2006 | Dettinger et al. | 707/100 |
| 2007/0016575 A1* | 1/2007 | Hurst-Hiller | G06F 17/30893 |
| 2008/0065995 A1* | 3/2008 | Bell et al. | 715/751 |
| 2009/0281970 A1* | 11/2009 | Mika | G06F 17/241 |
| | | | 706/12 |
| 2010/0036888 A1 | 2/2010 | Carter et al. | |
| 2010/0114925 A1* | 5/2010 | Shafer et al. | 707/759 |
| 2010/0204923 A1* | 8/2010 | White | G06N 7/00 |
| | | | 702/19 |
| 2012/0330728 A1* | 12/2012 | Enyeart | G06Q 10/00 |
| | | | 705/7.39 |
| 2013/0036137 A1* | 2/2013 | Ollis | G06F 17/30864 |
| | | | 707/771 |

* cited by examiner

EXTENDING TAGS FOR INFORMATION RESOURCES

RELATED APPLICATIONS

This application is based on and claims the benefit of priority from European Patent Application 11190719.2, filed on Nov. 25, 2011, the entire disclosure of which is incorporated herein by reference.

FIELD OF THE INVENTION

The invention relates generally to a method for extending a tag of an information resource in an information network.

BACKGROUND OF THE INVENTION

An exploding number of resources in company-internal and company-external networks, such as the Internet, make it a necessity to develop tools and methods to organize the resources for an easy, fast and organized access. An emerging technology allows users to structure or categorize content autonomously in order to ease and personalize navigation through large, complex information spaces by a technology called tagging. The users may be single users using private tags or, there may be user communities using public or collaborative tags.

A tag may be a keyword or term associated with, or, assigned to a piece of information or an information resource. A piece of information or an information item may be a picture, a geographical map, a blog entry, a video clip, a text document, e.g., provided in HTML format (hypertext markup language), and so on—generally speaking, all available information resources on or in a network, like the Internet. The tag may describe the information item and may enable keyword-based classification and search of the information resource. A pool of tags available in a system is usually aggregated in what is referred to a tag cloud. Tag clouds may represent a visual depiction of tags available in the system. More often applied tags may be displayed more predominantly in a user interface, by, e.g., increasing a font size of the tag or changing the color. So far, tags are used simply in the form of words serving as an identifier for the underlying content, i.e., as expressions or abbreviations representing or describing the content they have been assigned to. Several technologies are available to enhance tag-based classification.

SUMMARY OF THE INVENTION

According to one embodiment, a method for extending a tag (e.g., logically and/or semantically extending a tag) for an information resource in an information network may be provided. The method may comprise providing a group of tags in a user interface. The group of tags may be stored in a database. The method may further comprise selecting at least one tag out of the group of tags and linking the tag to an information resource using the user interface, and extending the tag such that the resulting extended tag is a semantically structured string of characters building a first expression including a first operand, a first operator and a first value, wherein the tag is the operand, such that the extended tag is machine-interpretable by a parser, and such that the tag of the information resource is extended to the machine-interpretable, extended tag.

According to another embodiment, a tagging module for extending a tag of an information resource in an information network may be provided. The tagging unit may comprise a database for storing a group of tags, a user interface for displaying the group of tags. The user interface may comprise a selection unit adapted for selecting at least one tag out of the group of tags and linking the tag to an information resource and an extending unit adapted for extending the tag such that the resulting extended tag is a semantically structured string of characters building a first expression including a first operand, a first operator and a first value, wherein the tag is the operand, such that the extended tag is machine-interpretable by a parser, and such that the tag of the information resource is extended to the machine-interpretable, extended tag.

BRIEF DESCRIPTION OF THE DRAWINGS

Preferred embodiments of the invention will now be described, by way of example only, and with reference to the following drawings.

DETAILED DESCRIPTION OF EXEMPLARY EMBODIMENTS

Figure 1:
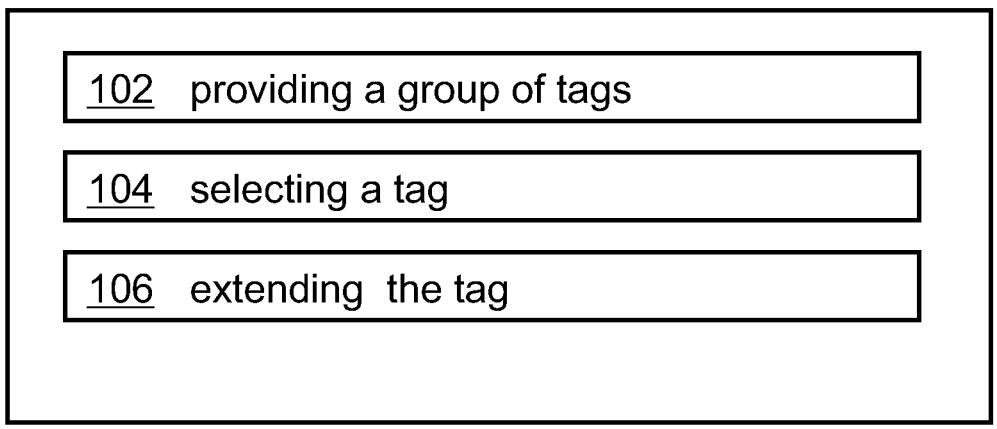
FIG. 1 shows a block diagram of an embodiment of the inventive method.

It may be noted that the information resources may be available via a local, private network, e.g., an intranet of a company, and/or alternatively, via a public network, e.g., the Internet. The information resources may be identifiable by URLs (Universal Resource Locator). The group of tags may also be seen as an operand cloud, which may be generically available on a network of computers or may be generated by a user or a user community. It may also be noted, that the extended tag may be delimited by a delimiter, e.g., a delimiting character, e.g., a blank or any other character.

It may also be noteworthy to mention that all user interactions, in particular, steps required for extending the tag, may be performed within the user interface or using the user interface.

In the context of this application, the following conventions have been followed:

Tagging—The term "tagging" may denote a process of linking a keyword to an information resource, in particular, to an address of an information resource stored in a storage resource on an information network.

Tag—The term "tag" may denote a simple keyword or a complex expression comprising a syntax used to identify information resource on or in an information network. Also, combined expressions with a logical operator between the expressions or as part of the expression may be called tags in the sense of this document.

Information network—The term "information network" may denote a private network via which stored resources may be accessible on the Internet. Access to information resources may typically be performed by using URLs. However, other addressing methods may be used.

Parser—The term "parser" may denote a component of an interpreter for a syntactic and/or semantic analysis and thus, checking for a correct syntax and for building a data structure implicit to input tokens. Parsers often may use a separate lexical analyzer for creating tokens from a sequence of input characters. Here, the parser may be used for an analysis of extended expressions, like extended tags representing more complex than simple conventional tags.

Extended tag—The term "extended tag" may denote a tag that may have been extended by a prefix and/or a suffix. Thus, a simple keyword or tag may become a much more complex linguistic or semantic construct, expressing semantically a meaning A tag, as well as an extended tag, may be composed of and/or may include a string of characters. Extended tags may be combined or chained by logical operators building combined extended tags.

Machine-interpretable—This term may denote a feature of a semantically structured string. A computer module, either in hardware, software or a combination of both, may interpret—using e.g., the parser—a semantically structured string of characters, e.g., an extended tag.

Operand—The term operand may denote an expression, e.g., a keyword whereupon which an operation expressed by an operator is performed. The operand may be the first component of general expression like operand_operator_value.

Operator—The operator may denote a logical operator like ">", i.e., greater than, "<", i.e., smaller than, or "=", i.e., equal. It may follow an operand.

Value—The value may denote a numerical value as an integer value or a real value. It may be understood as the last part of the above-mentioned general expression.

Directive—The term "directive" may denote an instruction linked to a condition. Another word for "directive" may be "an instruction". The directive may be used as a basis to perform a certain action. A directive may depend on an evaluation of the condition.

In some embodiments, the presented method for an access authorization for maintenance may offer a couple of advantages.

Tags may no longer be only simple keywords but more complex expressions representing e.g., conditions, or a combination of conditions, i.e., combined extended tags. Thus, it may be allowed to structure tags using prefixes and suffixes and so on, which may contain well-defined literals that may express sophisticated semantics. So, tags could make use of operators, in particular, mathematical and/or logical operators. As a general syntax, the following may be used:

identifier_operand_value, wherein the identifier may be seen as a conventional tag.

Extended tags of the form as discussed above, may allow users to organize, classify, and search in a much easier and faster way for information resources in the information network. In particular, this may be applicable for user communities, sharing the extended tags. Tags may be extended by different members of the communities, which may again be used as a basis for a further extended tag. So, over time, pretty complex expressions may be generated by different users of the community.

The option to link directives or instructions to such extended tags may allow triggering automatic actions based on the information resources. Addresses of these information resources, may, for example, be added to specific action lists, recommendation messages may be sent to the user or members of the community, and/or actions may be performed automatically, like buying stocks of a company if predefined conditions, expressed by the extended tag, may be fulfilled.

In one embodiment of the method, the extended tag may comprise additionally a second expression, such that the first expression and the second expression may form a combined expression. The second expression may consist of, and/or include, a second operand, a second operator and a second value, wherein the first expression and the second expression may be linked via a logical operator. Thus, the first expression and the second expression may semantically, and in the general format, be identical, but they may differ in specific values for the operand, the operator and the value. The logical operator may link the extended expressions, in particular by a logical "AND" or "OR" instruction. However, any other user defined operator may be defined.

According to an additional embodiment of the method, the method may additionally comprise storing the extended tag in the database for reuse as a tag. This may enable a user or members of a user community to manage extended tags as simple or word tags. The tags may again be extended, meaning, that additional expressions, e.g., conditions may be added.

According to an alternative embodiment, the method may also comprise identifying first expressions having identical first operands and identical first operators, and replacing the first values by a first placeholder, such that a first class of extended tags is built. Members of this first class of extended tags may be stored in a tag expression cloud registry. This tag expression cloud registry may also be part of the above-mentioned database or may be stored independently. Such a mechanism may automatically identify extended tags having the same base tag and the same operand, but only different values. If it may be determined that a larger number of such extended tags may exist in a cloud tag, which may be used by a larger community, other members of the community may be advised that such a first class of extended tags may be popular by other community members. This may enhance the collective wisdom of the community.

In an embodiment of the method, the method may also comprise identifying combined expressions having identical first operands and identical first operators as well as having identical second operands and identical second operators, and replacing the first value by a first placeholder and replacing the second value by a second placeholder, such that a second class of extended tags may be built. Thus, in a similar way as the first class of extended tags may be built, also the second class of extended tags may be built. Also, this second class of extended tags may be made known to the user community for reuse. It may also be possible to form more classes of extended tags by adding extended tags building an even more extended tag expression. Also, these extended tags with a first and a second placeholder, or even more complex tags may be stored in a combined tag expression cloud registry, which may be part of the database.

According to another embodiment of the method, the method may comprise additionally presenting information resources conforming to the extended tag, in particular, to the condition. This may mean that information resources may be made known to users, the information resource conforming to a condition expressed in an extended tag. Such a process may also include searching of the information resources using the extended tag as a condition automatically. All users of a user community may benefit from this.

Users may use the first or the second class of extended tags for their advantage. This may be expressed by the following embodiment. According to this embodiment, the selection of a tag may comprise selecting an entry from the first class of extended tags or the second class of extended tags and may comprise defining, in particular—selecting a first value from a value cloud—a first value for the first placeholder, and in case the tag may be chosen from the second class of extended tags also defining a second value—selecting a second value from a value cloud—such that a complete extended tag may be built. This way, users may again generate complete extended or combined tags starting with a skeleton comprising an operand and an operator to which only a value may be added. It should be understood that in case of a combined tag only one placeholder may be replaced by a value while the other placeholder may continue to be a placeholder.

According to one embodiment of the method, the extended tag may also comprise a directive, indicative of an action to be initiated if the expression or the combined expression may be evaluated as true, wherein the directive is selectable in the user interface from a directive contribution registry. The directive may also be understood as an instruction to be performed if the condition expressed by the expression, or the combined expression, may be determined as a true condition. This may enable a complete new way to manage and use tags as a sort of programming language for managing information resources, wherein users may generate related program statements. Firstly, conditions may be added to tags of information resources, new information resources may be identified using these extended tags, and actions may be triggered based on an evaluation of such a condition.

Consequently, there may also be an embodiment of the method, wherein the method may comprise additionally interpreting the directive and executing a result of the interpretation by an action unit.

Furthermore, a computer or computing system may comprise the tagging module, as described above, and referring to the method for extending a tag for an information resource.

In another embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should be also noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for extending a tag for an information resource may be given. Afterwards, embodiments of the method and a tagging module will be described.

FIG. 1 shows a block diagram of an embodiment of the inventive method 100 for tagging of information resources. The method 100 may comprise providing, 102, a group of tags, stored in the database. The group of tags may be provided in a user interface. Furthermore, the method may comprise selecting, 104, at least one tag out of the group of tags and linking the tags to an information resource using the user interface, and extending, 106, the tag, such that the resulting extended tag may be a semantically structured string of characters building a first expression including, and/or consisting of, a first operand, a first operator and a first value, wherein the tag is the operand, such that the extended tag may be machine-interpretable by a parser, and such that the tag of the information resource is extended to the machine-interpretable, extended tag.

Figure 2:
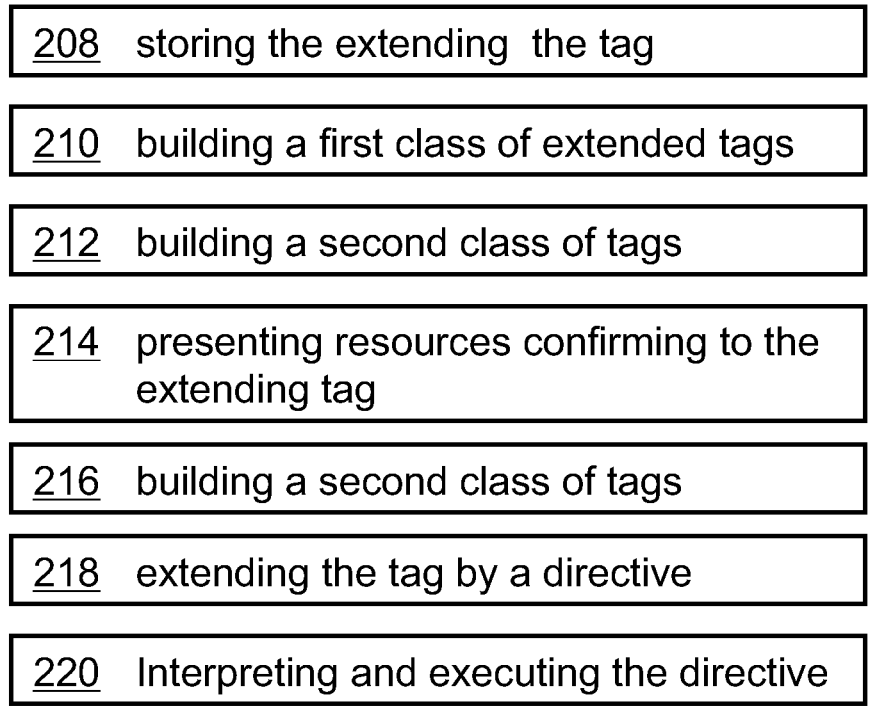
FIG. 2 shows a block diagram representation of optional method steps.

FIG. 2 shows a block diagram representations of additional operations that may be included. These may comprise storing the extended tag, 208, in the database, building, 210, a first class of tags by replacing different values in expressions if the operand and the operator may be identical and the corresponding value may be different. Also a building, 212, of a second class of extended expression as tags is illustrated. According to the method, it may also be possible to present, 214, automatically information resources that may conform to a condition expressed by an extended tag autonomously. This may release a user from actively searching for information items. The information resources may actively be presented in a user interface to a user.

Furthermore, block 216 may represent a building of a second class of extended tags having two placeholders as described above. Moreover, block 218 may represent additionally an extension of the tag by a directive; whereas block 220 may express that the directive may be interpreted and actually executed to achieve a result characterized by the directive. All steps 208 to 220 may be additional features to the method for extending a tag for an information resource.

Figure 3:
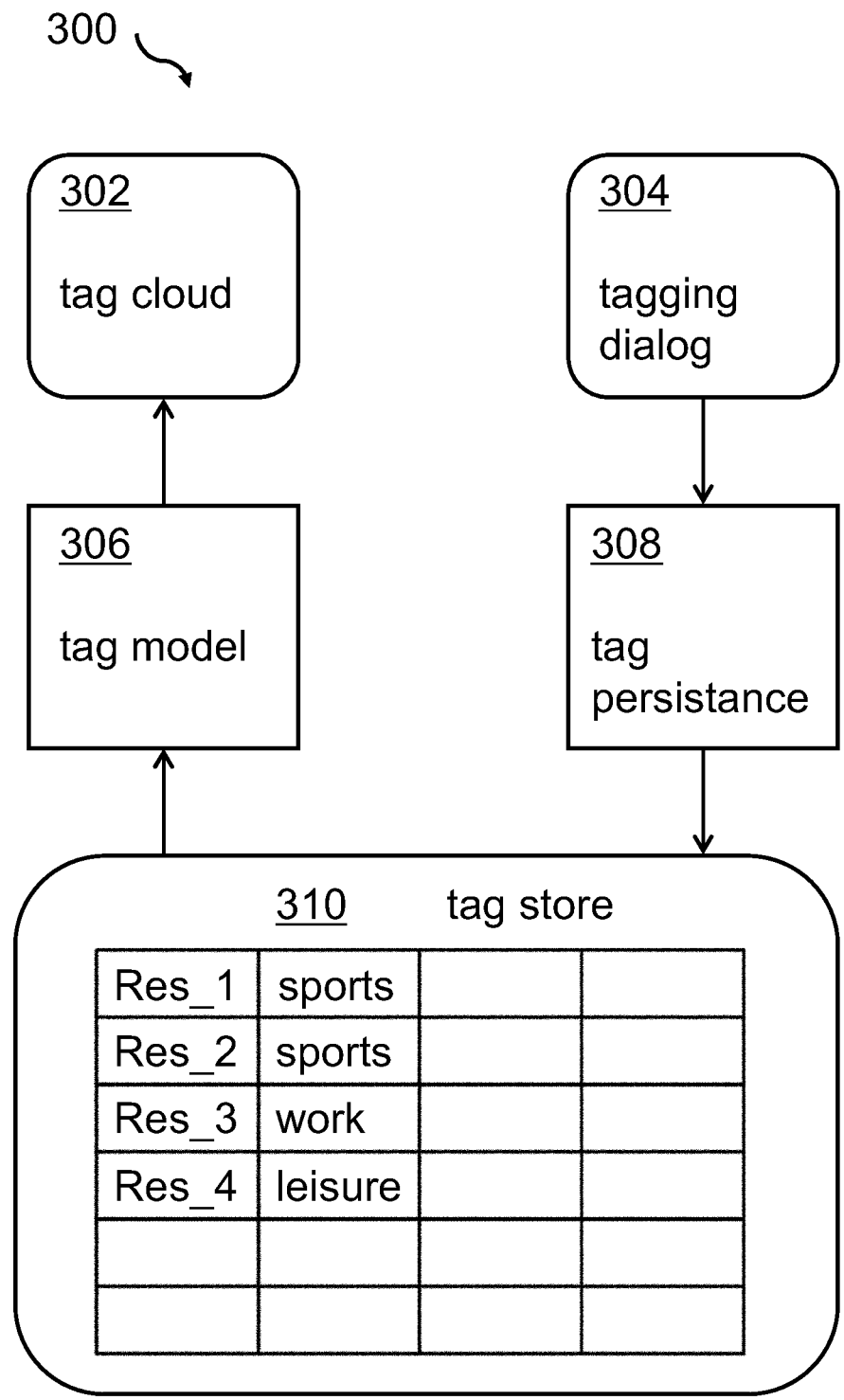
FIG. 3 shows a block diagram for storing a tag cloud in a tag store or a database.

FIG. 3 shows a block diagram 300 for storing a tag cloud in a tag store or a database. A tag store 310 or database may be organized in rows and columns. Each row may comprise an indicator for an information resource—like e.g., Res_1, Res_2, Res_3, Res_4. These indicators may be addressed, e.g., in form of a URL. Beside these indicators, tags or keywords like "sports", "work", or "leisure" are shown. Such a database may represent a simple tag model 306. From the database, tags and simple aggregations may be loaded and may be displayed as a tag cloud 302 to a user. It may be displayed as a tag that may have been assigned to an information resource in the system. Based on the quantity or other conditions, the tags may be displayed more or less predominant in the display.

The displayed tags may be the basis for a tagging dialogue 304, which may allow associating a tag with an information resource according to the state of the art. A tag persistence module 308 may store the newly assigned tags together with pointer or address of the information resource in the database.

Figure 4:
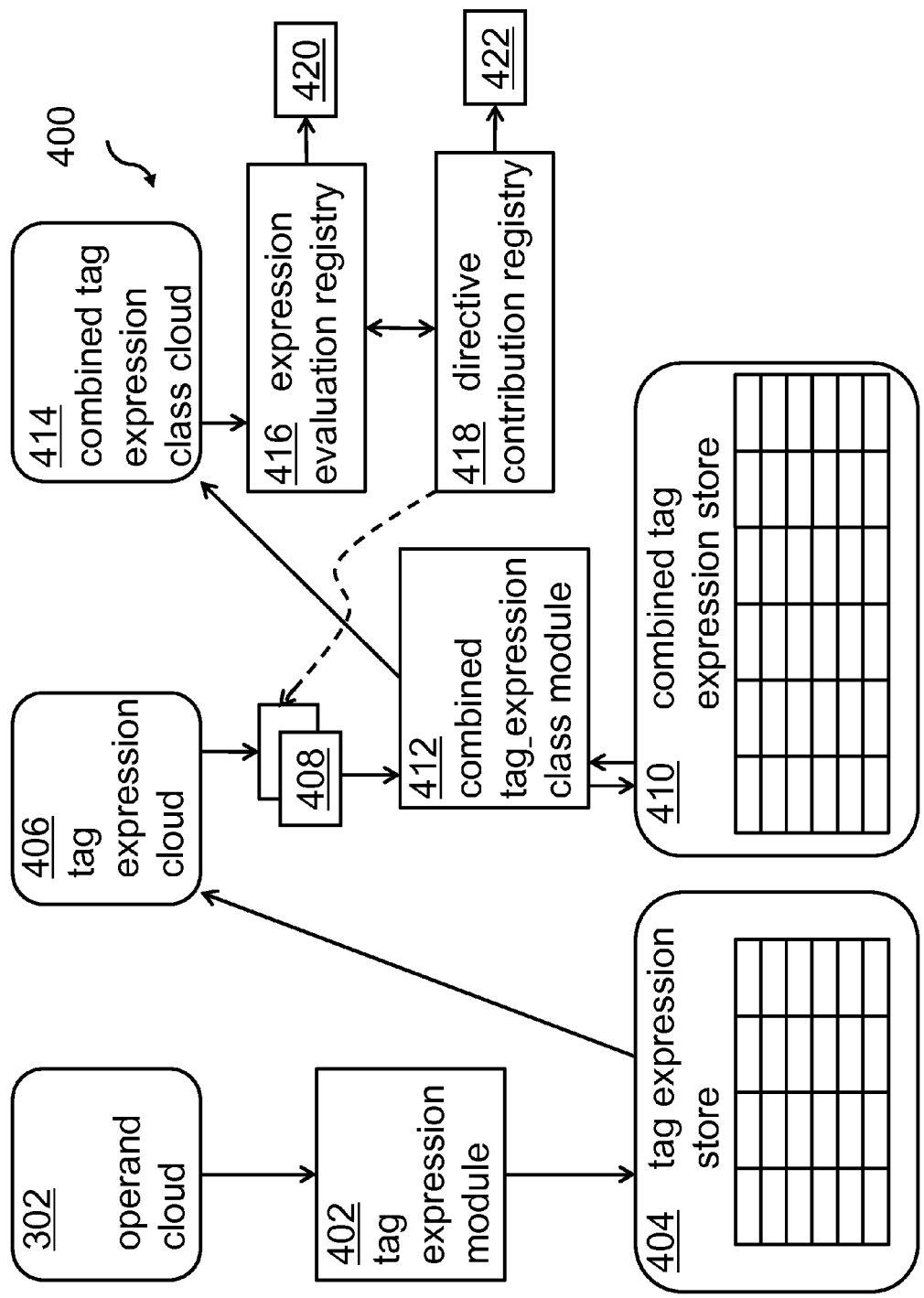
FIG. 4 shows a block diagram of an embodiment of a more complex setup of extended and combined tags together with a directive.

FIG. 4 shows a block diagram of an embodiment of a more complex setup of extended and combined tags together with a directive. The operand cloud 302 may be the same as in FIG. 2. It may comprise in one example, e.g., simple tags like "revenue", "roi", "kgv", "eps", "ebit". A tag expression module 402 may store specified tags in the tag expression store. The simple tags may have been extended by operators, e.g., ">", "<", "=" and a specified, user-defined value, such that rows in the tag expression store may look like this:

| | | |
|---|---|---|
| Revenue | > | 1000 |
| Revenue | > | 2000 |
| Renenue | > | 5000 |
| ebit | > | 200 |
| ebit | > | 100 |
| ebit | < | 10 |

The last column may be used for optional features, e.g., a directive (see below). These expressions may be displayed together in a user interface as tag expression cloud 406 with elements like "revenue >1000". A company home page or an information resource representing stocks of the company with annual revenue greater than 1000 may be tagged with this extended tag. In another example, an information resource representing stocks of a company with earning per share greater 100, may be tagged with another tag, e.g., "eps >100". More often used extended tags may be displayed more predominant. The extended tags from the tag expression cloud 406 may be combined using the user interface with logical operator like "&" for a logical "and" or "||" for a logical "or". The result may be combined extended tags 408 representing a tag with at least two conditions of the exemplary form "kgv<15&roi>15". A plurality of such a combined extended tag may be stored in a combined expression tag store (not shown).

A module called combined tag expression class module may be utilized for recognizing classes of combined extended expressions. From these combined extended expressions values may be extracted, such that the extended expression may build a class of combined tag expressions of the exemplary form:

| | | | | | |
|---|---|---|---|---|---|
| revenue | > | & | roi | > | |
| revenue | > | & | ebit | > | |
| kgv | < | & | loss | < | doBuy |
| revenue | > | & | roi | > | |
| ... | ... | ... | ... | ... | |

It may be recognized that values may no longer be included, but may be displayed in the user interface as placeholders, e.g., in the form "kgv<_||loss<_doBuy". A plurality of such expressions may be called a combined tag expression class cloud 414.

A user may specify the placeholder "_" and add a directive. In this case of a stock purchase, the condition expresses by example "doBuy". The meaning of the "doBuy" directive may be defined according to a usage of the tagging system. In case of the stock purchasing example, it may initiate a sending of an alarm to a user and the "doBuy" message for stocks of a specified company may be displayed. The procurement process of the stock may also be triggered of an automatic buy of stocks. An example of a complete combined extended tag may be "kgv<_15||roi>15doBuy", wherein a user may have added the respective value "15" in both cases for a placeholder "_". These combined extended tags including a directive may be stored in an expression evaluation registry 416.

A link between a specified action or instruction as how to execute a certain directive may be stored in a directive contribution registry 418. It may contain expressions for a directive as well as the underlying action to be taken. Expressions for directives, e.g., "doBuy", may be used when extending a combined extended tag 408 using and accessing the tag expression cloud 406. This may be shown as dashed line from block 418 to block 408.

The expression evaluation registry 416 may have an active component making expression evaluation results 420 available to a user, e.g., in a user interface. In case of the exemplary stock example, company names or addresses to home pages of companies, complying with the conditions expressed in an extended tag or a combined extended tag, may be actively displayed.

Also, the directive contribution registry 418 may have an active component executing commands linked to directives. Directive contribution results 422 may, e.g., have the following instructions that may be executed automatically or just prepared for a confirmation by a user: "add IBM to watch-list", "buy Google stocks", or "request SAP details".

Arrows in FIG. 4 may illustrate main data flows between dedicated blocks. Using this technology, a user or a user community, gets a simple and easy to use but highly sophisticated instrument at hand to manipulate actions based on information resources available in a network, e.g., the Internet.

Figure 5:
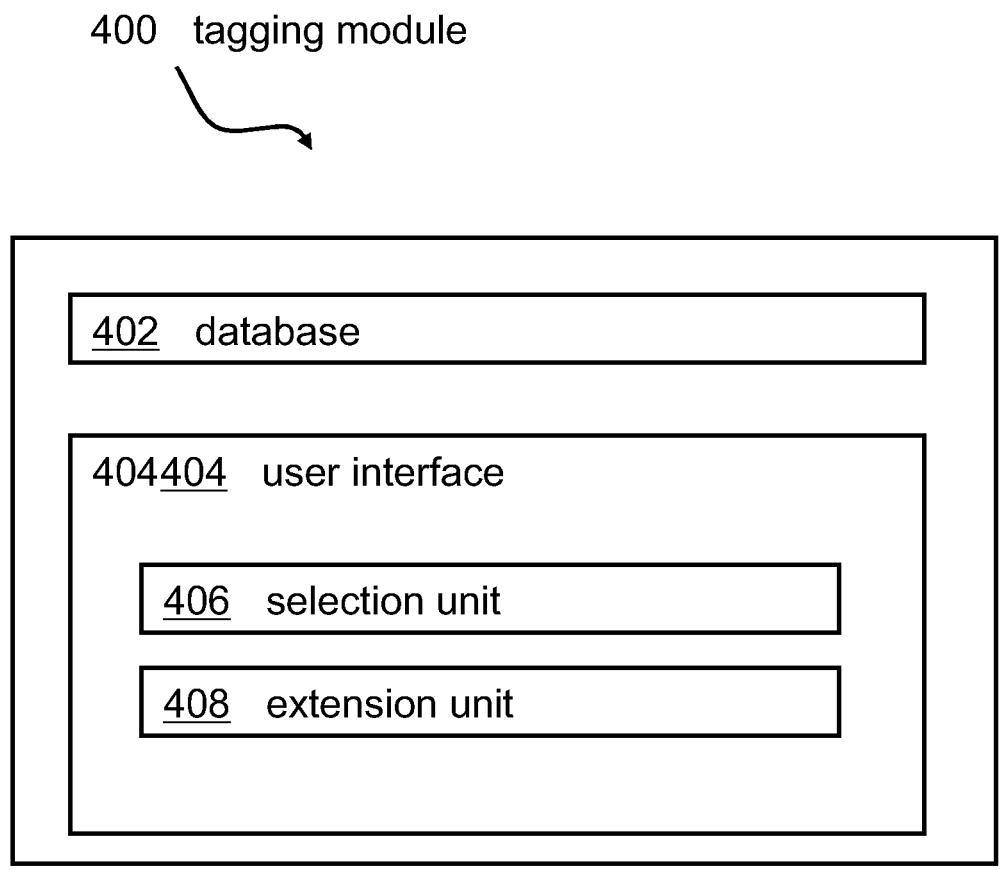
FIG. 5 shows an embodiment of the tagging module.

FIG. 5 shows an embodiment of the tagging module 500. The tagging unit 500 for tagging of information resources may comprise a database 502 for storing a group of tags, and a user interface 504 for displaying the group of tags. The user interface 504 may comprise a selection unit 506 adapted for selecting at least one tag out of the group of tags and linking the tag to an information resource, as well as, an extending unit 508 adapted for extending the tag, such that the resulting extended tag is a semantically structured string of characters building a first expression, consisting of a first operand, a first operator and a first value, wherein the tag may be the operand, such that the extended tag may be machine-interpretable by a parser, and such that the tag of the information resource is extended to the machine-interpretable, extended tag.

It may be clear that the above-mentioned user interface may also be instrumental for other interactions in the tagging process, e.g., creating combined extended tags or adding a value or a directive to a simple tag.

Figure 6:
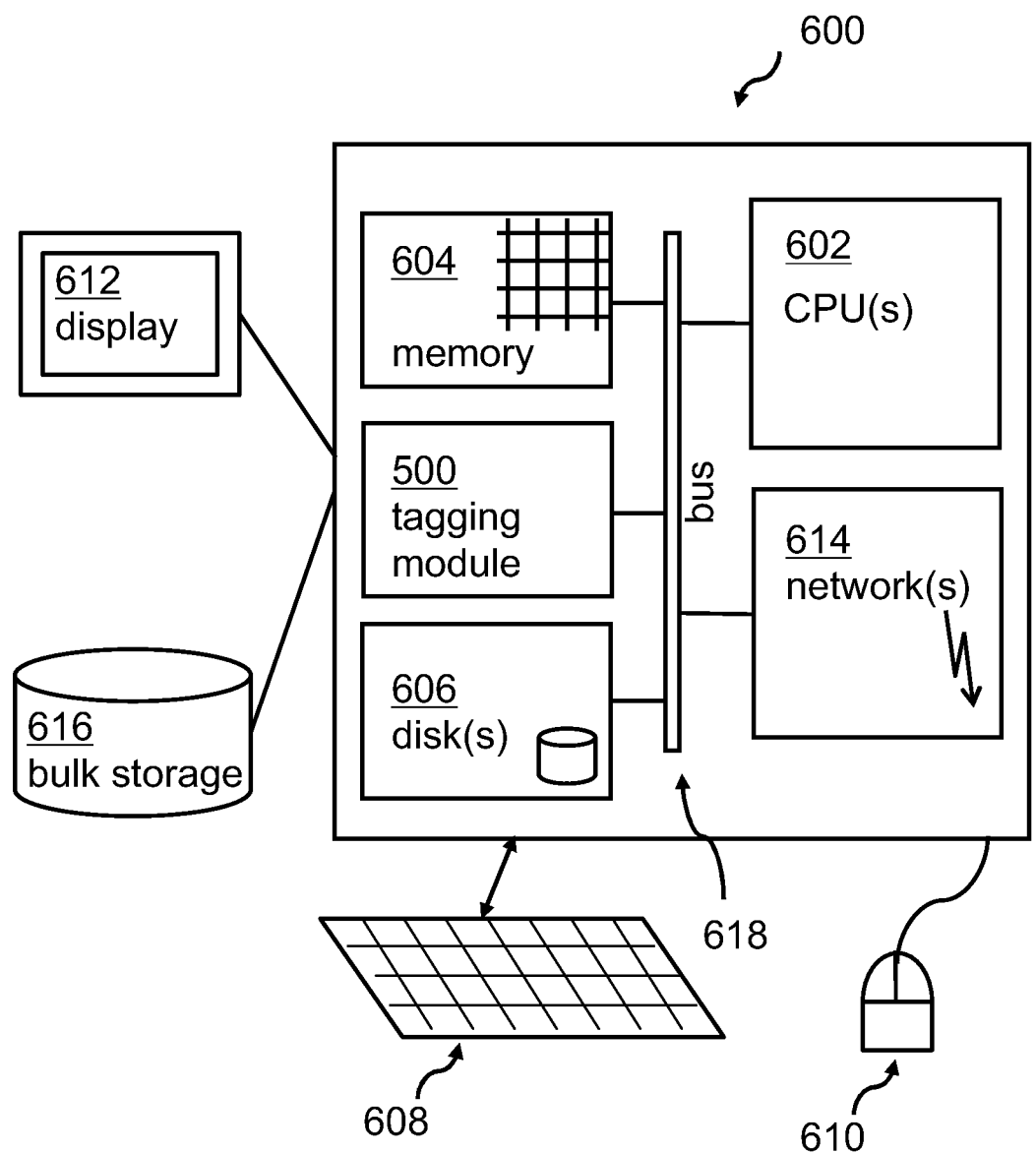
FIG. 6 shows an embodiment of a computing system comprising the tagging module.

Embodiments of the invention may be implemented together with virtually any type of computer, regardless of the platform being suitable for storing and/or executing program code. For example, as shown in FIG. 6, a computing system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities, typical of today's computers (not shown). The memory elements 604 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, the tagging module 500 may be attached to the bus system 618.

The computing system 600 may also include input means, such as a keyboard 608, a pointing device such as a mouse 610, or a microphone (not shown). Alternatively, the computing system may be equipped with a touch sensitive screen as main input device. Furthermore, the computer 600, may include output means, such as a monitor or screen 612 [e.g., a liquid crystal display (LCD), a plasma display, a light emitting diode display (LED), or cathode ray tube (CRT) monitor]. The computer system 600 may be connected to a network (e.g., a local area network (LAN), a wide area network (WAN), such as the Internet or any other similar type of network, including wireless networks via a network interface connection 614. This may allow a coupling to other computer systems or a storage network, or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

Further, those skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources, or a smartphone.

Further, software instructions to perform embodiments of the invention may be stored on a computer readable medium, such as a compact disk (CD), a diskette, a tape, or any other computer readable storage device.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. On the other side, the term "comprising" may also include the case of "consisting of". Also, elements described in association with different embodiments may be combined. It should also be noted that reference signs in the claims should not be construed as limiting elements.

The invention claimed is:

1. A method for extending a tag of an information resource in an information network, the method comprising:
providing a group of tags, stored in a database, in a user interface, wherein the group of tags comprises a plurality of tags including at least a first extended tag created by a user, the first extended tag comprising a first expression including one or more operands, one or more operators and one or more first values, wherein the each of the one or more operands is the same as another tag in the group of tags;
selecting at least one tag out of the group of tags and linking the at least one tag to an address of an information resource using the user interface, wherein linking the at least one tag includes storing the tag in a tabular format, and in a record including the address of the information resource and the tag, and zero or more other tags, and wherein the at least one tag directly points to the address of the information resource to link the at least one tag to the address of the information resource;
extending the at least one tag linked to the address of the information resource to form a second extended tag, such that the resulting second extended tag is a semantically structured string of characters comprising at least its own respective first expression including at least its own respective first operand, first operator and first value, wherein the at least one tag is the respective first operand;
identifying, from the group of tags, two or more first expressions having identical first operands and identical first operators and replacing the first values of the identified two or more expressions by a first placeholder, such that a first class of extended tags including the identical first operands, the identical first operators, and the first placeholder is built, wherein selecting the at least one tag comprises selecting an entry from the first class of extended tags;
wherein the second extended tag further comprises a directive indicative of an action to be initiated if the expression, is evaluated as true, wherein the directive is selectable in the user interface from a directive contribution registry; and
evaluating the second extended tag by a parser, and if the evaluation is evaluated to be true, interpreting and initiating the action of the directive and executing a result of the interpretation by an action unit.

2. The method according to claim 1, wherein the second extended tag comprises a second expression, such that the first expression and the second expression form a combined expression, the second expression including a second operand, a second operator, and a second value, wherein the first expression and the second expression are linked via a logical operator.

3. The method according to claim 2, further comprising identifying, from the group of tags, two or more combined expressions having identical first operands and identical first operators and having identical second operands and identical second operators, and replacing the first value of the two or more combined expressions by a first placeholder, and replacing the second value of the two or more combined expression by a second placeholder such that a second class of extended tags is built.

4. The method according to claim 3, wherein selecting the at least one tag comprises selecting an entry from the first class of extended tags or the second class of extended tags, and defining a first value for the first placeholder, and when the at least one tag is selected from the second class of extended tags, defining a second value, such that the second extended tag is built.

5. The method according to claim 2, wherein the directive is further indicative of an action to be initiated if the combined expression, is evaluated as true.

6. The method according to claim 1, further comprising storing the second extended tag in the database for reuse as a tag in the group of tags.

7. The method according to claim 1, further comprising presenting information resources identifiable by the extended tag.

8. A computing system including a processor and a memory configured to perform operations for extending a tag of an information resource in an information network, the computing system comprising:
a tagging module, the tagging module comprising a database for storing a group of tags, and a user interface for displaying the group of tags, wherein the group of tags comprises a plurality of tags including at least a first extended tag created by a user, the first extended tag comprising a first expression including one or more operand, one or more operators and one or more first values, wherein the each of the one or more operands is the same as another tag in the group of tags, the user interface comprising:
a selection unit adapted for selecting at least one tag out of the group of tags and linking the at least one tag to an address of an information resource, wherein linking the at least one tag includes storing the tag in a tabular format, and in a record including the address of the information resource and the tag, and zero or more other tags, and wherein the at least one tag directly points to the address of the information resource to link the at least one tag to the address of the information resource, and
an extending unit adapted for extending the at least one tag linked to the address of the information resource to form a second extended tag, such that the resulting second extended tag is a semantically structured string of characters comprising at least its own respective first expression including at least its own respective first operand, first operator and first value, wherein the at least one tag is the respective first operand, wherein the extending unit is adapted for identifying, from the group of tags, two or more first expressions having identical first operands and identical first operators and replacing the first values of the identified two or more expressions by a first placeholder, such that a first class of extended tags including the identical first operands, the identical first operators, and the first placeholder is built, wherein selecting the at least one tag comprises selecting an entry from the first class of extended tags;
wherein the second extended tag further comprises a directive indicative of an action to be initiated if the expression, is evaluated as true, wherein the directive is selectable in the user interface from a directive contribution registry; and
evaluating the second extended tag by a parser, and if the evaluation is evaluated to be true, interpreting and initiating the action of the directive and executing a result of the interpretation by an action unit.

9. A computer program product stored on a non-transitory computer usable medium having a plurality of instructions stored thereon, which, when executed by a processor, cause the processor to perform operations comprising:
providing a group of tags, stored in a database, in a user interface;
selecting at least one tag out of the group of tags and linking the at least one tag to an address of an information resource using the user interface, wherein linking the at least one tag includes storing the tag in a tabular format, and in a record including the address of the information resource and the tag, and zero or more other tags, and wherein the at least one tag directly points to the address of the information resource to link the at least one tag to the address of the information resource;
extending the at least one tag linked to the address of the information resource to form a second extending tag, such that the resulting second extended tag is a semantically structured string of characters comprising at least its own respective first expression including at least its own respective first operand, first operator and first value, wherein the at least one tag is the respective first operand,
identifying, from the group of tags, two or more first expressions having identical first operands and identical first operators and replacing the first values of the identified two or more expressions a first placeholder, such that a first class of extended tags including the identical first operands, the identical first operators, and the first placeholder is built, wherein selecting the at least one tag comprises selecting an entry from the first class of extended tags;
wherein the second extended tag further comprises a directive indicative of an action to be initiated if the expression, is evaluated as true, wherein the directive is selectable in the user interface from a directive contribution registry; and
evaluating the second extended tag by a parser, and if the evaluation is evaluated to be true, interpreting and initiating the action of the directive and executing a result of the interpretation by an action unit.

\* \* \* \* \*